United States Patent

Mizuno

[11] Patent Number: 5,975,045
[45] Date of Patent: Nov. 2, 1999

[54] APPARATUS AND METHOD FOR CONTROLLING DIRECT INJECTION ENGINES

[75] Inventor: Hiroyuki Mizuno, Toyota, Japan

[73] Assignee: Toyota Jidosha Kabushiki Kaisha, Toyota, Japan

[21] Appl. No.: 09/152,462

[22] Filed: Sep. 14, 1998

[30] Foreign Application Priority Data

Sep. 18, 1997 [JP] Japan .................................. 9-253698

[51] Int. Cl.$^6$ ........................... F02M 45/02; F02M 51/00
[52] U.S. Cl. ............................ 123/295; 123/305; 123/430
[58] Field of Search .................................. 123/295, 276, 123/305, 430

[56] References Cited

U.S. PATENT DOCUMENTS

| 4,685,432 | 8/1987 | Saito et al. | 123/276 |
|---|---|---|---|
| 5,078,107 | 1/1992 | Morikawa | 123/295 |
| 5,170,759 | 12/1992 | Ito | 123/276 |
| 5,215,053 | 6/1993 | Ito | 123/276 |
| 5,720,254 | 2/1998 | Yoshida et al. | 123/305 |
| 5,740,777 | 4/1998 | Yamamoto et al. | 123/305 |
| 5,826,559 | 10/1998 | Ichimoto et al. | 123/295 |

FOREIGN PATENT DOCUMENTS 5-52145   3/1993   Japan .

*Primary Examiner*—Willis R. Wolfe
*Assistant Examiner*—Mahmoud M. Gimie
*Attorney, Agent, or Firm*—Oliff & Berridge, PLC

[57] ABSTRACT

An apparatus for controlling an engine to switch combustion modes in accordance with the load applied to the engine. An injector injects fuel into a combustion chamber to perform a plurality of combustion modes. A valve, such as a swirl control valve, is arranged in an intake passageway to adjust the intensity of the swirling motion produced in the combustion chamber. An ECU determines the combustion mode that is to be performed in accordance with the load applied to the engine. The ECU controls the valve to optimize the intensity of the swirling motion in accordance with the determined combustion mode. The ECU also controls the injector to perform the determined combustion mode. When the combustion mode that is to be performed switches between stratified charge or semi-stratified charge and homogeneous charge, the ECU controls the injector to perform semi-stratified charge combustion for a certain time period before performing a newly determined combustion mode. The ECU varies the time period in accordance with the difference between the actual position and a target position of the valve. This stabilizes combustion when switching combustion modes and produces a smooth transition between combustion modes.

20 Claims, 7 Drawing Sheets

APPARATUS AND METHOD FOR CONTROLLING DIRECT INJECTION ENGINES

BACKGROUND OF THE INVENTION

The present invention relates to apparatuses and methods for controlling engines that inject fuel directly into their cylinders. More particularly, the present invention relates to apparatuses and methods for changing combustion modes in engines in accordance with the load applied to the engine.

In a typical engine, fuel is injected into an intake passage from a fuel injector. The fuel is then homogeneously mixed with air passing through the intake passage and sent into a combustion chamber. In the combustion chamber, the homogeneous air-fuel mixture is ignited by a spark plug and burned to generate engine power.

The burning of air-fuel mixture, which is distributed homogeneously in the combustion chamber, is generally referred to as homogeneous charge combustion. An engine performing homogeneous charge combustion has a throttle valve arranged in its intake manifold. The size of the throttle valve opening is adjusted to vary the amount of air supplied to the combustion chamber and thereby control engine power.

However, homogeneous charge combustion produces strong vacuum pressure in the intake manifold when the throttle valve throttles the intake manifold. The vacuum pressure increases pumping loss, which occurs when the air-fuel mixture is drawn into the combustion chamber from the intake manifold. This decreases the efficiency of the engine.

To solve this problem, an engine capable of performing stratified charge combustion has been proposed. Stratified charge combustion is performed by injecting fuel directly into the combustion chamber such that the fuel is concentrated about the spark plug. Ignition by the spark plug burns the stratum of rich air-fuel mixture surrounding the spark plug. This, in turn, burns the stratum of lean air-fuel mixture surrounding the rich mixture. The power of a stratified charge combustion engine is basically controlled by adjusting the amount of fuel injected toward the vicinity of the spark plug. Accordingly, pumping loss is decreased since the throttle valve need not throttle the intake manifold. This improves the efficiency of the engine. Furthermore, stratified charge combustion improves fuel efficiency since the engine can be driven with an air-fuel mixture having a lean air-fuel ratio.

Japanese Unexamined Patent Publication No. 5-52145 describes an engine that switches combustion modes between stratified charge combustion, homogeneous charge combustion, and semi-stratified charge combustion depending on the load applied to the engine. When the engine load is relatively low, stratified charge combustion is performed by injecting fuel into the combustion chamber during the compression stroke. When the engine load is relatively high, homogeneous charge combustion is performed by injecting fuel into the combustion chamber during the intake stroke. When the engine load shifts from low to high or from high to low, semi-stratified charge combustion is performed before proceeding to homogeneous charge combustion or stratified charge combustion. Fuel is injected twice, once during the intake stroke and once during the compression stroke, to perform semi-stratified charge combustion. Accordingly, semi-stratified charge combustion is an intermediate combustion mode performed between stratified charge and homogeneous charge.

In addition to a throttle valve, which adjusts the amount of intake air, the engine includes a swirl control valve, which adjusts the intensity of the swirling motion of air in the combustion chamber. When the combustion mode is shifted between stratified charge combustion and homogeneous charge combustion in accordance with changes in the engine load, the positions of these valves are varied to adjust the state of the intake air (flow rate and amount) in the combustion chamber. However, when varying the positions of the valves, a certain length of time is required for the valves to reach their target position. In other words, the valves have a response delay. This further delays the adjustment of the intake air conditions (amount and swirl). During such delays, the conditions of the intake air in the combustion chamber remain inappropriate for the combustion mode that is to be performed. This may cause unstable combustion of the air-fuel mixture.

Accordingly, the engine described in Japanese Patent Publication No. 5-52145 performs semi-stratified charge combustion for a certain length of time before switching between stratified charge combustion and homogeneous charge combustion. In other words, semi-stratified charge combustion is performed for a predetermined time period when switching combustion modes between stratified charge combustion and homogeneous charge combustion to achieve an intake air state that is optimal for the combustion mode that is to be performed. Thus, semi-stratified charge combustion stabilizes combustion and allows smooth switching of combustion modes.

However, the time required for semi-stratified charge combustion is not necessarily constant. For example, if the difference between the actual position of the valves and the target position is large or if the state of the intake air is changing dramatically, the duration of semi-stratified charge combustion may be insufficient. On the other hand, if the difference is small, the duration of semi-stratified charge combustion may be too long.

If the semi-stratified charge combustion time period is too short, the combustion mode is switched before the intake air conditions are appropriate for the new combustion mode. This may lead to power fluctuation and misfires. If the semi-stratified charge combustion time is too long, fuel efficiency will deteriorate. Accordingly, if the time for semi-stratified charge combustion is constant, unstable combustion may occur when switching combustion modes between stratified charge and homogeneous charge and there will be a loss in fuel efficiency.

SUMMARY OF THE INVENTION

Accordingly, it is an objective of the present invention to provide an apparatus and a method for controlling for a direct injection engine that guarantees stable combustion when switching combustion modes.

To achieve the above objective, the present invention provides an apparatus for controlling an engine that produces power by burning a mixture of air and fuel in a combustion chamber. The engine performs a combustion mode selected from a plurality of combustion modes. The combustion modes are stratified charge combustion in which the mixture is distributed in a concentrated manner in the combustion chamber, homogeneous charge combustion in which the mixture is distributed in a homogeneous manner in the combustion chamber, and semi-stratified charge combustion having characteristics of both stratified charge combustion and homogeneous charge combustion. An injector injects fuel into the combustion chamber. The injector injects fuel in a manner appropriate for the combustion mode being performed. An adjuster adjusts the state of the air drawn into the combustion chamber. A selector selects one among the combustion modes in accordance with the load applied to the engine. A first controller controls the adjuster such that the state of the air drawn into the combustion chamber is appropriate for the selected combustion mode. A second controller controls the injector to perform the selected combustion mode. The second controller controls the injector to perform semi-stratified charge combustion for a certain time period before performing a newly selected combustion mode when the selector changes the combustion mode between stratified charge combustion or semi-stratified charge combustion and homogeneous charge combustion. A varier varies the time period for performing semi-stratified charge combustion in accordance with changes in the state of the air drawn into the combustion chamber.

The present invention also provides a method for controlling an engine that produces power by burning a mixture of air and fuel in a combustion chamber. The method includes the step of injecting fuel into the combustion chamber with an injector. The injector injects fuel in a manner appropriate for the combustion mode being performed. The method also includes the steps of selecting the combustion mode that is to be performed in accordance with the load applied to the engine, adjusting the state of the air drawn into the combustion chamber in accordance with the selected combustion mode, and controlling the injector to perform injection according to the selected combustion mode. The injector is controlled to perform semi-stratified charge combustion for a certain time period before performing a newly selected combustion mode when the selected combustion mode is switched between stratified charge combustion or semi-stratified charge combustion and homogeneous charge combustion. The method further includes the step of varying the time period for performing semi-stratified charge combustion in accordance with changes in the state of the air drawn into the combustion chamber.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
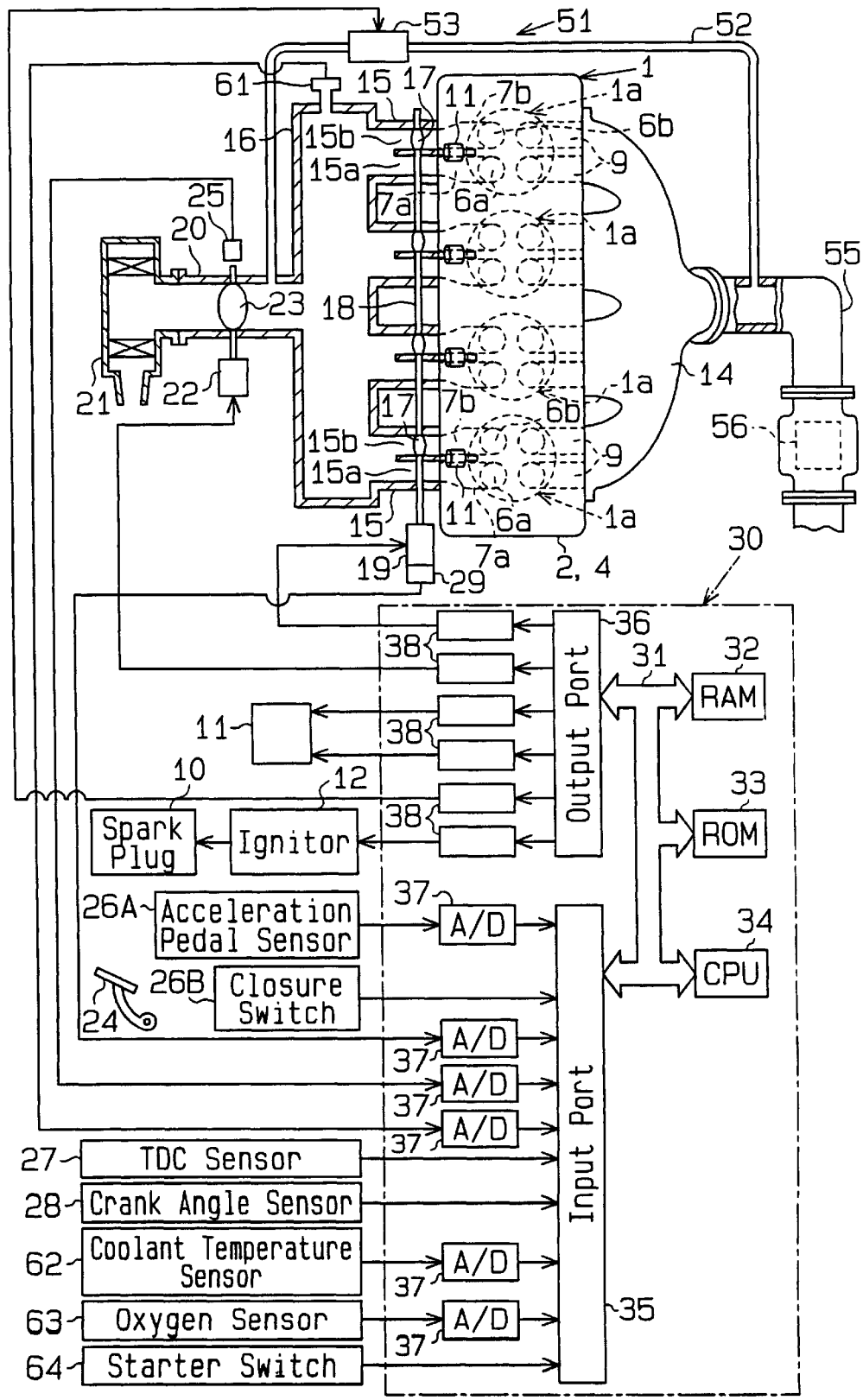
FIG. 1 is a schematic view showing a first embodiment of a direct injection engine controller according to the present invention.
Figure 2:
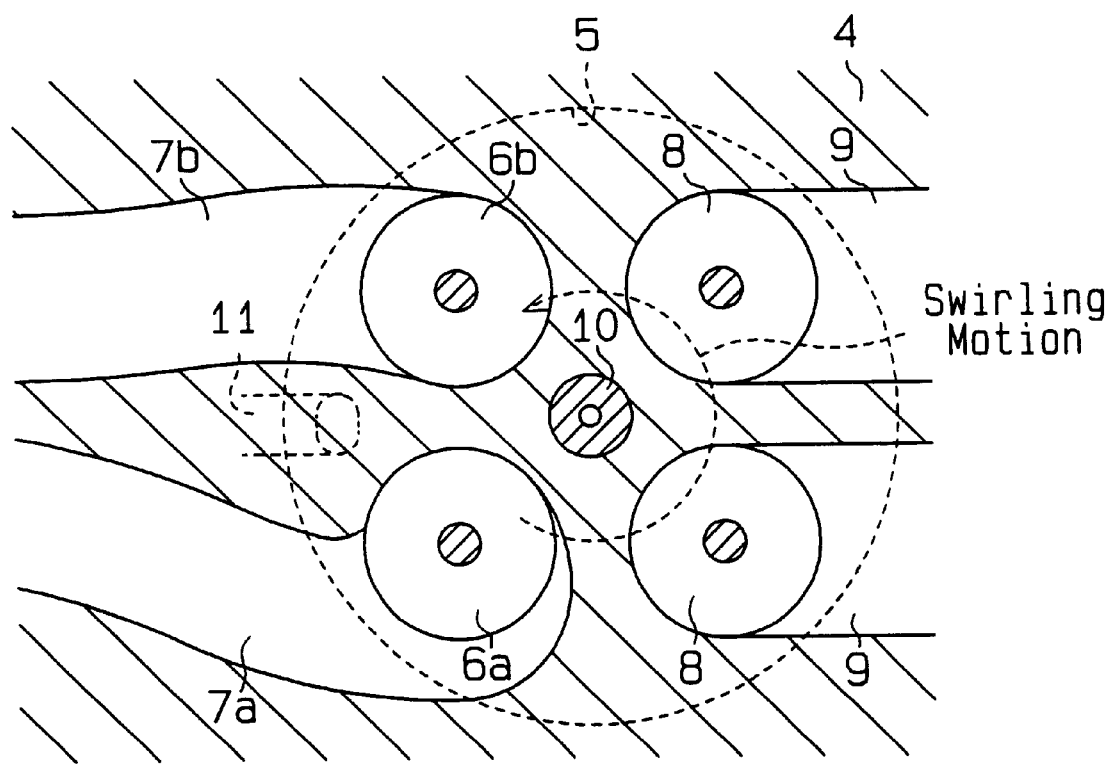
FIG. 2 is an enlarged cross-sectional view showing a cylinder of the engine illustrated in FIG. 1.

A first embodiment of an apparatus for controlling fuel injection, or a fuel injection controller, according to the present invention will now be described with reference to FIGS. 1 to 4. The fuel injection controller is applied to a direct cylinder injection type engine. As shown in FIG. 1, the engine 1 is provided with four cylinders 1a that are formed in a cylinder block 2. Each cylinder 1a accommodates a piston. A cylinder head 4 is arranged on top of the cylinder block 2. Therefore, as shown in FIG. 2, a combustion chamber 5 is defined between the piston and the cylinder head 4 in each cylinder 1a. Each cylinder 1a is provided with four valves. The four valves include a first intake valve 6a, a second intake valve 6b, and two exhaust valves 8. The first intake valve 6a is arranged in correspondence with a first intake port 7a, while the second intake valve 6b is arranged in correspondence with a second intake port 7b. In the same manner, each of the two exhaust valves 8 is arranged in correspondence with an exhaust port 9. The first and second intake ports 7a, 7b and the two exhaust ports are defined in the cylinder head 4.

As shown in FIG. 2, the first intake port 7a is a helical port that extends in a helical manner. The second intake port 7b extends in a generally straight manner. A spark plug 10 is arranged in correspondence with each combustion chamber 5 at the middle section of the cylinder head 4. High voltage is applied to the spark plugs 10 by an ignitor 12 through a distributor (not shown). The ignition timing of each spark plug 10 is determined by the output timing of the high voltage sent from the ignitor 12.

A fuel injector 11 is arranged in the vicinity of each set of first and second intake valves 6a, 6b on the inner wall of the cylinder head 4. The fuel injector 11 injects fuel directly into the associated cylinder 1a.

In the preferred and illustrated embodiment, the engine 1 performs stratified charge combustion, homogeneous charge combustion, and semi-stratified charge combustion. When stratified charge combustion is performed, each fuel injector 11 injects fuel into the corresponding combustion chamber 5 as the associated piston carries out the final stage of the compression stroke. This concentrates the injected fuel about the spark plug 10. In this state, a throttle valve 23, which will be discussed below, is fully opened. When homogeneous charge combustion is performed, the fuel injector 11 injects fuel into the combustion chamber 5 during the intake stroke. The injected fuel is then homogeneously mixed with the air drawn into the combustion chamber 5 through the intake ports 7a, 7b. When semi-stratified charge combustion is performed, the fuel injector 11 injects fuel into the combustion chamber 5 twice, once during the intake stroke and once during the final stage of the compression stroke.

As shown in FIG. 1, the first and second intake ports 7a, 7b of each cylinder 1a are connected to a surge tank 16 by a first intake passage 15a and a second intake passage 15b, respectively. The first and second intake passages 15a, 15b extend through an intake manifold 15. A swirl control valve 17 is arranged in each second intake passage 15b. The swirl control valves 17 are connected to, for example, a step motor 19 by a common shaft 18. The step motor 19 is controlled by signals sent from an electronic control unit (ECU) 30.

However, the swirl control valves 17 may be driven by the pressure in the associated first and second intake ports 7a, 7b instead of by the step motor 19.

Each swirl control valve 17 adjusts the flow of air, or the intensity of the swirling motion of air, drawn into the associated combustion chamber 5. More specifically, if the size of the opening of the swirl control valve 17 becomes small, the flow rate of air drawn into the combustion chamber 5 through the associated first intake port 7a relative to the flow rate of air drawn into the combustion chamber 5 through the associated second intake port 7b increases. This increases the intensity of the swirling motion. Thus, each swirl control valve 17 serves as an adjuster for adjusting the state of the air drawn into the associated combustion chamber 5.

The surge tank 16 is connected to an air cleaner 21 through an intake duct 20. A throttle valve 23, which is opened and closed by a step motor 22, is arranged in the intake duct 20. The ECU 30 sends signals to drive the step motor 22 and open or close the throttle valve 23. The throttle valve 23 adjusts the amount of intake air that passes through the intake duct 20 and enters the combustion chambers 5. The intake duct 20, the surge tank 16, and the first intake passages 15a form an intake passageway. A throttle sensor 25 is arranged in the vicinity of the throttle valve 23 to detect the size of the opening, or the position, of the valve 23.

The exhaust ports 9 of each cylinder 1a are connected to an exhaust manifold 14. The exhaust gas resulting from combustion of the air-fuel mixture is sent to an exhaust duct (not shown) through the exhaust manifold 14. A catalyst 56 is arranged in the exhaust duct 55.

The engine 1 is provided with a conventional exhaust gas recirculation (EGR) mechanism 51 that includes an EGR passage 52 and an EGR valve 53, which is arranged in the EGR passage 52. The EGR passage 52 communicates the intake duct 20, which is located at the downstream side of the throttle valve 23, with the exhaust duct 55. The EGR valve 53 includes a valve seat, a valve body, and a step motor (none of which is shown). The step motor intermittently displaces the valve body with respect to the valve seat to alter the position of the EGR valve 53. When the EGR valve 53 opens, some of the exhaust gas sent into the exhaust duct 55 flows into the intake duct 20 though the EGR passage 52. In other words, some of the exhaust gas is recirculated to the intake air by the EGR mechanism 51. The recirculation amount of the exhaust gas is controlled by the EGR valve 53.

The ECU 30 is a digital computer provided with a random access memory (RAM) 32, a read only memory (ROM) 33, a central processing unit (CPU) 34, which is a microprocessor, an input port 35, and an output port 36 that are connected to one another by a bidirectional bus 31.

An acceleration pedal 24 is connected to an acceleration pedal sensor 26A. When the driver depresses the acceleration pedal 24, the acceleration pedal sensor 26A generates voltage proportional to the degree of depression, or position, of the acceleration pedal 24. Thus, the output voltage of the acceleration pedal sensor 26A corresponds to the acceleration pedal position value ACCP. The voltage of the acceleration pedal sensor 26A is transmitted to the input port 35 by way of an analog to digital (A/D) converter 37. A complete closure switch 26B is located near the acceleration pedal 24 to detect when the pedal 24 is not depressed at all. The closure switch 26B outputs a complete closure signal of one when the acceleration pedal 24 is not depressed and outputs a complete closure signal of zero when the acceleration pedal 24 is depressed. These signals are sent to the input port 35.

A top dead center (TDC) sensor 27 generates a pulse signal when, for example, the piston in the first cylinder 1a reaches its top dead center position during the intake stroke. A crank angle sensor 28 generates a pulse signal each time a crankshaft of the engine 1 is rotated, for example, by a crank angle CA of 30 degrees. The pulse signals generated by the TDC sensor 27 and the crank angle sensor 28 are sent to the CPU 34 by way of the input port 35. Based on these signals, the CPU 34 obtains the engine speed NE, the crank angle CA, and the top dead center position in each cylinder 1a.

A swirl control valve sensor 29 detects the rotational angle of the shaft 18 to obtain the opening angle, or position, of the swirl control valves 17 (swirl control valve angle SCVP). The swirl control valve sensor 29 then generates a signal corresponding to the detected angle and sends the signal to the input port 35 by way of an A/D converter 37.

The pressure in the surge tank 16 is detected by an intake pressure sensor 61. The temperature of the engine coolant is detected by a coolant temperature sensor 62. The oxygen concentration of the exhaust gas is detected by an oxygen sensor 63, which is located at the upstream side of the catalyst 56. The signals generated by the sensors 61, 62, 63, which represent the detected results, are each sent to an associated A/D converter 37 to be further sent to the input port 35.

The engine 1 is started by a starter (not shown). The starter includes a starter switch 64, which detects whether or not the starter is actuated. The starter is actuated to start the engine 1 by turning an ignition switch (not shown) from an OFF position to an ON position and further to a starting position. The starter switch 64 sends a starter signal to the input port 35 only when the starter is being actuated, that is, only when the engine 1 is being cranked. When the engine 1 is started, or when the engine 1 begins to run, the ignition switch is returned to the ON position from the starting position to drive the engine 1 in a normal state.

The fuel injectors 11, the step motors 19, 22, the ignitor 12, and the step motor of the EGR valve 53 are each connected to the output port 36 by an associated drive circuit 38. The ECU 30 optimally controls the fuel injectors 11, the step motors 19, 22, the ignitor 12 (the spark plugs 10), and the EGR valve 53 based on programs stored in the ROM 33.

Control programs executed by the ECU 30 will now be described with reference to a flowchart of a combustion mode control routine illustrated in FIGS. 3(a) and 3(b). The combustion mode control routine is employed to determine the combustion mode to be performed by the engine 1. Other routines such as fuel injection control, ignition control, and intake air control are executed based on the combustion mode determined by the combustion mode control routine.

Figure 3A:
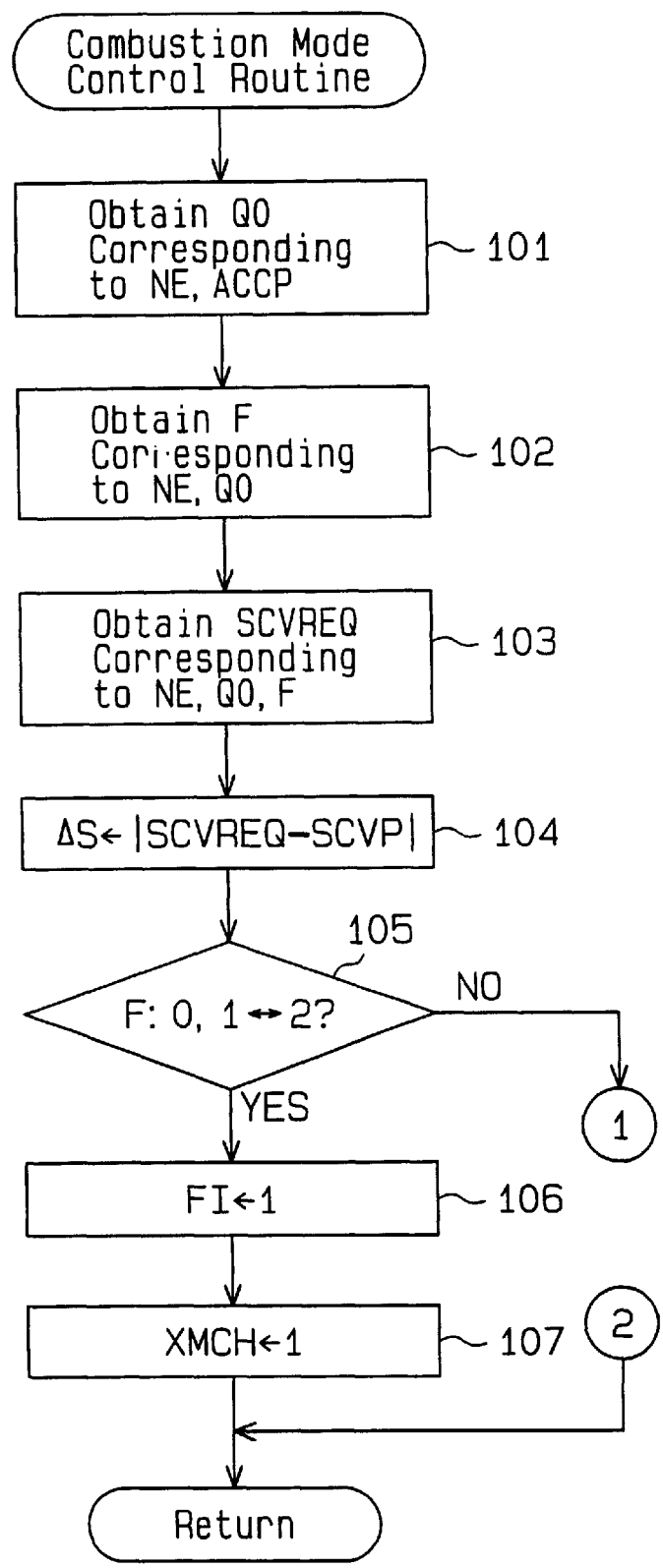
FIGS. 3(a) and 3(b) are flowcharts illustrating a combustion mode control routine executed by an ECU.

When entering the combustion control routine, the ECU 30 first carries out step 101 as shown in FIG. 3(a). In this step, the ECU 30 obtains a target injection amount QO corresponding to the engine speed NE and the acceleration pedal position value ACCP by referring to a map (not shown). The target injection amount QO represents the load applied to the engine 1.

At step 102, the ECU 30 sets a first command flag F corresponding to the present engine speed NE and target injection amount QO by referring to a map (not shown). The first command flag F represents the combustion mode of the engine 1 and is used to control the state of the air drawn into the combustion chambers 5. In other words, the valves employed to adjust the state of the intake air (the throttle valve 23, the EGR valve 53, and the swirl control valves 17)

are controlled in accordance with the combustion mode indicated by the first command flag F. If the engine 1 employs an idle speed control valve to control the amount of intake air during idling, the position of the idle speed control valve would also be controlled in accordance with the combustion mode indicated by the first command flag F.

The first command flag F can have one of three values. The values respectively represent stratified charge combustion, homogeneous charge combustion, and semi-stratified charge combustion. The value of zero (0) represents stratified charge combustion, the value of two (2) represents homogeneous charge combustion, and the value of one (1) represents semi-stratified charge combustion. Accordingly, as the target injection amount increases gradually, or as the engine load increases, the first command flag F changes from zero to one and then from one to two.

At step 103, the ECU 30 obtains a target position value SCVREQ of the swirl control valves 17 corresponding to the present engine speed NE, target injection amount QO, and first command flag F by referring to a map (not shown). For example, if the first command flag F is set at zero, which indicates stratified charge combustion, the mapped target position value SCVREQ corresponds to a relatively small swirl valve opening size to increase the intensity of the swirl motion. On the other hand, if the first command flag F is set at two, which indicates homogeneous charge combustion, the mapped target position value SCVREQ corresponds to a relatively large swirl valve opening to decrease the intensity of the swirl motion.

At step 104, the ECU 30 subtracts the value of the actual swirl control valve position value SCVP, which is detected by the swirl control valve sensor 29, from the target position value SCVREQ. The ECU 30 then sets the absolute value of the difference as a swirl deviation value ΔS.

At step 105, the ECU 30 determines whether or not the first command flag F has been changed from zero or one to two or vice-versa during the present cycle. In other words, the ECU 30 determines whether or not the first command flag F has been switched between a value representing stratified charge combustion or semi-stratified charge combustion and a value representing homogeneous charge combustion. If such change is confirmed, the ECU 30 proceeds to step 106.

At step 106, the ECU 30 determines that semi-stratified charge combustion must be performed and thus sets a second command flag FI to one. In the same manner as the first flag F, the second command flag FI takes three command values. Zero (0) represents stratified charge combustion, two (2) represents homogeneous charge combustion, and one (1) represents semi-stratified charge combustion. However, the second command flag FI differs from the first command flag F in that it is used to control the actual fuel injection mode and the ignition timing. That is, the ECU 30 controls the fuel injectors 11 and the ignitor 12 in accordance with the fuel injection mode and injection timing required to perform the combustion mode indicated by the second command flag FI.

At step 107, the ECU 30 sets a performance flag XMCH to one to indicate that semi-stratified charge combustion is to be performed. Subsequent processing is temporarily terminated afterward.

Consequently, the positions of the throttle valve 23, the EGR valve 53, and the swirl control valve 17 are controlled optimally in accordance with the combustion mode set by the first command flag F. Meanwhile, the fuel injectors 11 are controlled to perform semi-stratified charge combustion. More specifically, an amount of fuel corresponding to the target injection amount QO is injected twice from each fuel injector 11 into the associated cylinder 1a, once during the intake stroke and once during the compression stroke. The ignitor 12 is also controlled so that the spark plugs 10 ignite the air-fuel mixture at a timing optimal for semi-stratified charge combustion.

Figure 3B:
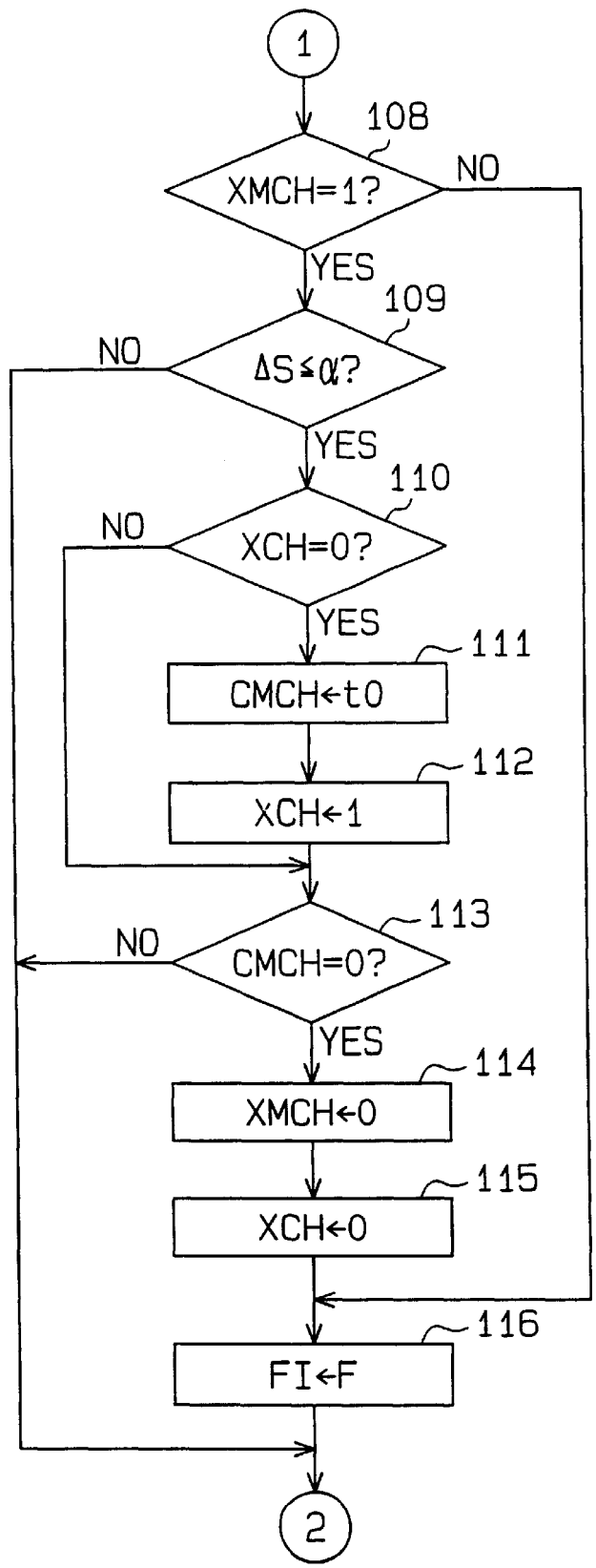

In step 105, if it is confirmed that the value of the first command flag F has not been switched between two and zero or one, the ECU 30 proceeds to step 108, which is illustrated in FIG. 3(b). At step 108, the ECU 30 determines whether or not the performance flag XMCH is set at one. If it is determined that the performance flag XMCH is not set at one, or is set at zero, the ECU 30 proceeds to step 116. At step 116, the ECU 30 sets the second command flag FI at a value equal to that of the first command flag F and then temporarily terminates subsequent processing. If it is determined that the performance flag XMCH is set at one in step 108, the ECU 30 proceeds to step 109.

At step 109, the ECU 30 determines whether or not the present swirl deviation value ΔS is equal to or smaller than a predetermined reference value α. If it is determined that the swirl deviation value ΔS is greater than the reference value α, the ECU 30 temporarily terminates subsequent processing. Accordingly, if the value of the first command flag F had been changed between two and zero or one, and the swirl deviation value ΔS is greater than the reference value α, the engine 1 continues to perform semi-stratified charge combustion.

In step 109, if it is determined that the swirl deviation value ΔS is equal to or smaller than the reference value α, the ECU 30 proceeds to step 110. At step 110, the ECU 30 determines whether or not a counter flag XCH is set at zero. If it is determined that the counter flag XCH is set at zero, the ECU 30 determines that a delay counter (not shown) has not yet been set and thus proceeds to step 111.

At step 111, the ECU 30 sets the value of a predetermined time period t0 as a count value CMCH of the delay counter. At step 112, the ECU 30 sets the counter flag XCH to one to indicate that the delay counter has been set. A separate routine (not shown) is executed at predetermined time intervals to decrease the count value CMCH of the delay counter in a decremental manner until it becomes zero.

If the ECU 30 determines that the counter flag XCH is set at one in step 110, this indicates that the delay counter has already been set. In this case, the ECU 30 proceeds to step 113.

When the ECU 30 proceeds to step 113 from either step 110 or step 112, the ECU 30 decides whether or not the count value CMCH, which is decreased in a decremental manner periodically, is zero. If the count value CMCH has not yet reached zero, the ECU 30 temporarily terminates subsequent processing to continue semi-stratified charge combustion. If the count value CMCH has reached zero, the ECU 30 determines that the time period required for semi-stratified charge combustion has elapsed. In this case, the ECU 30 proceeds to step 114.

At step 114, the ECU 30 sets the performance flag XMCH to zero to indicate completion of semi-stratified charge combustion. At step 115, the ECU 30 sets the counter flag XCH to zero.

At step 116, the ECU 30 sets the value of the first command flag F to be the same as the value of the second command flag FI. The ECU 30 then temporarily terminates subsequent processing.

The switching of combustion modes will now be described with reference to FIG. 4. For example, if the acceleration pedal position value ACCP increases, which indicates greater pedal depression, the target injection amount QO, or the engine load, increases. When this causes the value of the first command flag F to change from zero, which indicates stratified charge combustion, to two, which indicates homogeneous charge combustion, the swirl control valve target position value SCVREQ is varied to a relatively large value, which corresponds to a relatively large valve opening and is optimal for homogeneous charge combustion, from a relatively small value, which is optimal for stratified charge combustion. Therefore, the swirl control valves 17 are controlled in accordance with the renewed target position value SCVREQ. However, a response delay, or difference between the actual position value SCVP and the target position value SCVREQ, occurs as the position of the swirl control valves 17 changes. The intensity of the swirl motion in the cylinders 1a is inappropriate for homogeneous charge combustion as long as a significant deviation value ΔS exists between the target position value SCVREQ and the actual position value SCVP.

However, in this embodiment, the value of the second command flag FI is switched from zero to one when the value of the first command flag F changes from zero to two. In other words, the fuel injectors 11 and the ignitor 12 are controlled to perform semi-stratified charge combustion when the position of the swirl control valves 17 changes from a value optimal for stratified charge combustion to a value optimal for homogeneous charge combustion (refer to steps 105, 106, 107 in FIG. 3(b)).

When the first command flag F changes, the engine 1 continues to perform semi-stratified charge combustion until the predetermined time period t0 elapses after the swirl deviation value ΔS becomes equal to or lower than the reference value α. When the predetermined time period t0 elapses, the ECU 30 changes the value of the second command flag FI to two, or the same value as the first command flag F, and performs homogeneous charge combustion (refer to FIG. 3(b)). When homogeneous charge combustion is commenced, the swirl control valves 17 have reached a position optimal for homogeneous charge combustion. In other words, homogeneous charge combustion is commenced as soon as the intensity of the swirl motion produced by each swirl control valve 17 becomes optimal for homogeneous charge combustion.

If the first command flag F is switched from two, which indicates homogeneous charge combustion, to zero, which indicates stratified charge combustion, or from one, which indicates semi-stratified charge combustion, to two, which indicates homogeneous charge combustion, semi-stratified charge combustion is performed for a certain period of time in accordance with the flowchart illustrated in FIGS. 3(a) and 3(b). Semi-stratified charge combustion is also performed for a certain period of time in accordance with the flowchart when the first command flag F is switched from two, which indicates homogeneous charge combustion, to one, which indicates semi-stratified charge combustion. In this case, since the first command flag F has been switched to one, the engine 1 continues to perform semi-stratified charge combustion after the certain period of time elapses.

As described above, semi-stratified charge combustion is performed when switching combustion modes in this embodiment. This stabilizes combustion when switching combustion modes. Furthermore, the switching of combustion modes is performed in a smooth manner.

When switching combustion modes, after the first command flag F is switched, the engine 1 continues to perform semi-stratified charge combustion until the predetermined time period t0 elapses after the swirl deviation value ΔS becomes equal to or lower than the reference value α. When the first command flag F is switched, a greater changing rate of the target position value SCVREQ results in a greater swirl deviation value ΔS. A larger swirl deviation value ΔS lengthens the time required for the swirl deviation value ΔS to become equal to or lower than the reference value α. Accordingly, the time period during which semi-stratified charge combustion is performed varies in accordance with the value of the swirl deviation value ΔS. Thus, semi-stratified charge combustion is continued until the state of the intake air becomes optimal for the combustion mode that is to be performed. In other words, the switching of combustion modes is completed substantially when the state of the intake air becomes optimal for the combustion mode that is to be performed. This prevents the occurrence of abnormalities, such as engine power fluctuation, misfires, and lower fuel efficiency, caused by an inappropriate semi-stratified charge combustion duration. Thus, the switching of combustion modes is carried out in a satisfactory manner.

The swirl control valves 17 are employed to adjust the swirl motion intensity, or state, of the air drawn into the associated combustion chambers 5. When the first command flag F is switched, a greater change in the target position value SCVREQ increases the rate at which the state of the intake air changes. Accordingly, the swirl deviation value ΔS is correlated with the rate at which the state of the intake air changes. That is, the time period during which semi-stratified charge combustion is performed varies in accordance with the rate at which the state of the intake air changes.

The engine 1 continues to perform semi-stratified charge combustion even after the value of the swirl deviation value ΔS becomes equal to or smaller than the reference value α until the predetermined time period t0 elapses. The predetermined time period t0 further optimizes the duration of semi-stratified charge combustion.

A second embodiment according to the present invention will now be described with reference to FIGS. 4 to 6. The method for determining the time period during which semi-stratified charge combustion continues differs from that of the first embodiment. More specifically, steps 101 to 105, which are shown in the flowchart of FIG. 3(a), are carried out in the same manner as the first embodiment. The subsequent steps are replaced by steps 201 to 205, which are shown in illustrated in the flowchart of FIG. 5.

When entering the combustion mode control routine of the second embodiment, the ECU 30 first carries outs steps 101 to 104 in accordance with the flowchart of FIG. 3(a). In other words, the ECU 30 computes the target injection amount QO, which corresponds to the engine load, and sets the first command flag F accordingly. The ECU 30 then obtains the target position value SCVREQ and computes the swirl deviation value ΔS.

Figure 5:
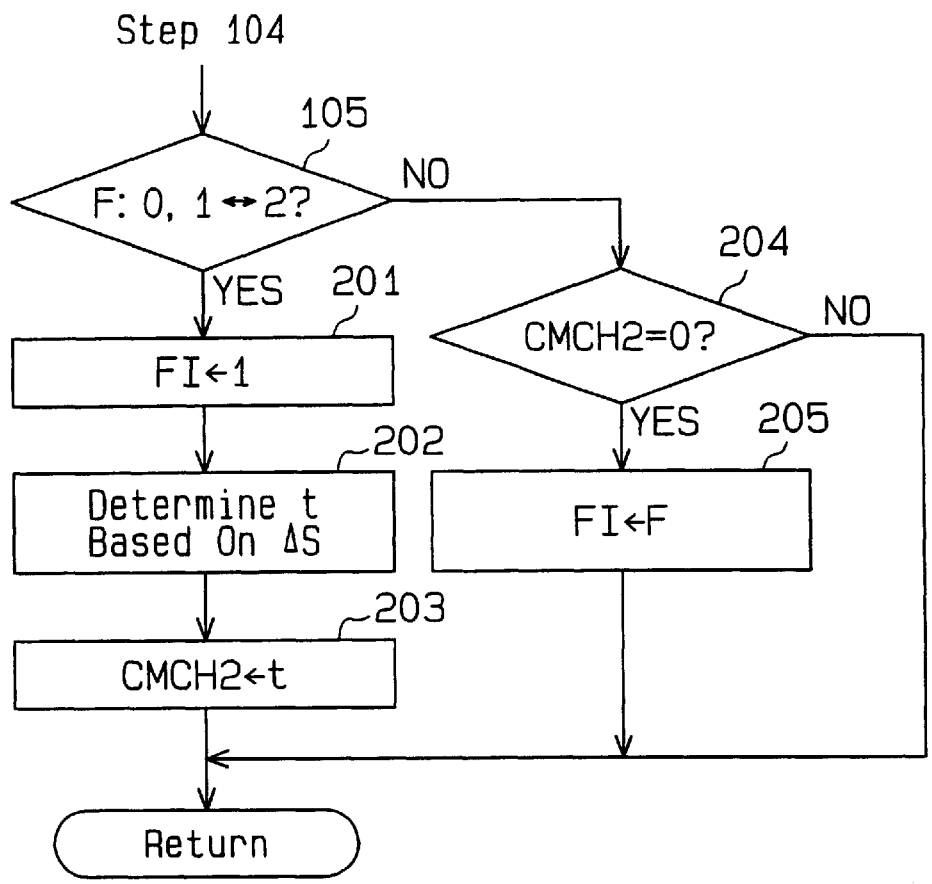
FIG. 5 is a flowchart illustrating part of a combustion mode control routine executed by the ECU in a second embodiment according to the present invention.
Figure 6:
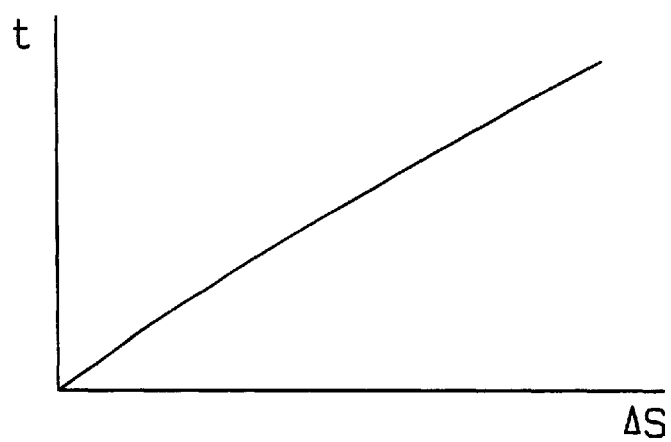
FIG. 6 is a map showing the relationship between the swirl deviation value and the time period for performing semi-stratified charge combustion.

As shown in FIG. 5, the ECU 30 subsequently proceeds to step 105 and determines whether the value of the first command flag F has been changed between two and zero or one. If it is determined that the first command flag F has been changed, the ECU 30 proceeds to step 201.

At step 201, the ECU 30 sets the second command flag FI to one since semi-stratified charge combustion must be performed. At step 202, the ECU 30 determines the time period t during which semi-stratified charge combustion is to be performed in accordance with the present swirl deviation value ΔS. The ECU 30 obtains the time period t by referring to a map such as that shown in FIG. 6. As shown in FIG. 6, when changing the first command flag F, the time period t increases as the swirl deviation value ΔS increases.

At step 203, the ECU 30 sets a count value CMCH2 for the delay counter equal to the value of the time period t and then temporarily terminates subsequent processing. The count value CMCH2 of the delay counter is decreased in a decremental manner at predetermined time intervals until reaching zero (as shown at the bottom row in FIG. 4).

If the first command flag F has not been changed between two and zero or one in step 105, the ECU 30 proceeds to step 204. At step 204, the ECU 30 determines whether or not the count value CMCH2 has reached zero. If the count value CMCH2 has not yet reached zero, the ECU 30 temporarily terminates subsequent processing to continue semi-stratified charge combustion. If it is determined that the count value CMCH2 has reached zero in step 204, the ECU 30 determines that the time period t, during which semi-stratified charge combustion must be performed, has elapsed. In this case, the ECU 30 proceeds to step 205.

At step 205, the ECU 30 sets the value of the present first command flag F to the value of the second command flag FI. The ECU 30 then temporarily terminates subsequent processing.

Figure 4:
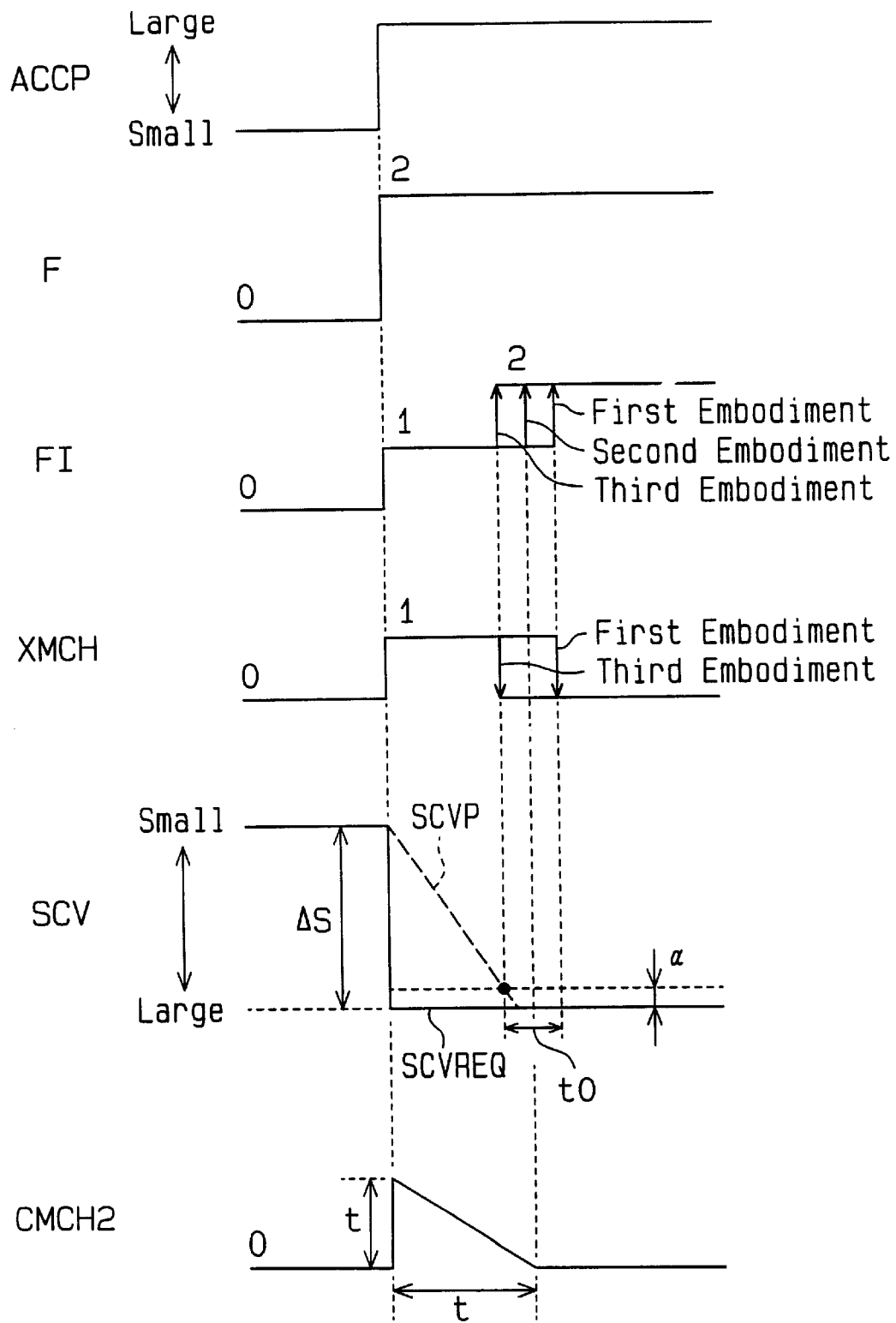
FIG. 4 is a timing chart showing the behavior of various parameters when the controller of FIG. 1 switches combustion modes.

In accordance with the routine of this embodiment, for example, the second command flag FI switches from zero to one when the first command flag F switches from zero to two as shown in the timing chart of FIG. 4. That is, if the position of the swirl control valves 17 changes from a value optimal for stratified charge combustion to a value optimal for homogeneous charge combustion, the fuel injectors 11 and the ignitor 12, which have been controlled to perform stratified charge combustion, are controlled to perform semi-stratified charge combustion. Semi-stratified charge combustion is performed from when the value of the first command flag F is switched to when the time period t elapses. After time period t elapses, the ECU 30 changes the value of the second command flag FI to two, which is the value of the first command flag F, to perform homogeneous charge combustion.

Accordingly, like the first embodiment, in this embodiment, the time period during which semi-stratified charge combustion is performed varies in accordance with the swirl deviation value ΔS, or the rate at which the state of the intake air changes.

It should be apparent to those skilled in the art that the present invention may be embodied in many other specific forms without departing from the spirit or scope of the invention. More specifically, the present invention may be embodied in the modes described below.

In the first embodiment, when the value of the first command flag F is switched, semi-stratified charge combustion is performed until the predetermined time t0 elapses even if the swirl deviation value ΔS becomes equal to or lower than the reference value α. However, in a third embodiment, as shown in FIG. 4, semi-stratified charge combustion may be terminated when the swirl deviation value ΔS becomes equal to or lower than the reference value α to perform the subsequent combustion mode.

Figure 7:
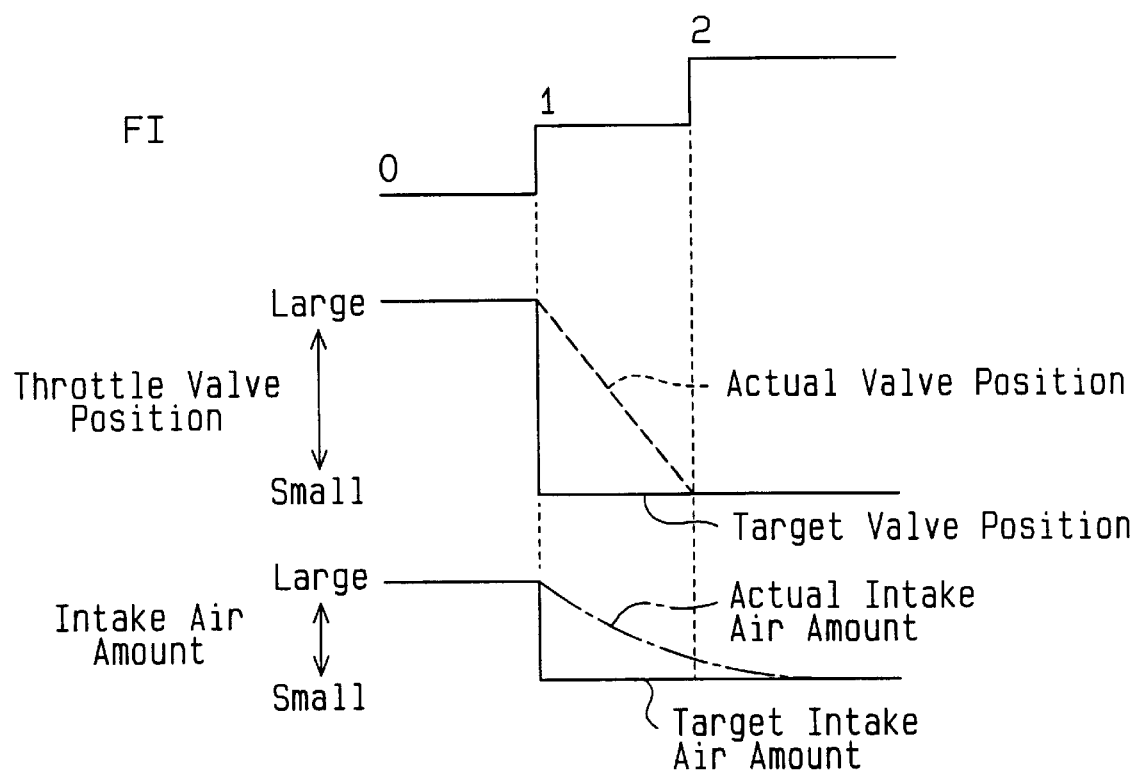
FIG. 7 is a timing chart showing the behavior of various parameters in a fourth embodiment according to the present invention.

In the first and second embodiments, the time period during which semi-stratified charge combustion is performed is changed in accordance with the swirl deviation value ΔS. However, the time period for semi-stratified charge combustion need not be determined by the swirl deviation value ΔS. Other parameters may be used instead to determine the time period for semi-stratified charge combustion as long as the parameter indicates changes in the intake air state. For example, with reference to FIG. 7, in a fourth embodiment according to the present invention, the time period for performing semi-stratified charge combustion may be varied in accordance with the difference between the values of the actual throttle valve position, which is detected by the throttle sensor 25, and a target throttle valve position, which is a command value sent from the ECU 30. Alternatively, the time period for performing semi-stratified charge combustion may be varied in accordance with the difference between the actual intake air amount detected by a sensor, such as an air flow sensor, and the target intake air amount. The advantages of such changes are the same as the first and second embodiments.

In the engine 1 shown in FIG. 1, semi-stratified charge combustion is performed by injecting fuel during the intake stroke and during the compression stroke. However, semi-stratified charge combustion may be performed in other ways. For example, during semi-stratified charge combustion, a relatively large amount of fuel may be injected during the intake stroke to obtain a rich air-fuel ratio, which enhances combustion. In this case, the ignition timing is retarded to suppress a torque increase that would be caused by the increased fuel injection amount.

The engine 1 of FIG. 1 includes helical first intake ports 7a to produce a swirling motion in the associated combustion chambers 5. However, the structure for producing the swirling motion may be eliminated. In such case, the swirl control valves 17, and the step motor 19 for actuating the control valves 17 are eliminated.

The present invention is applied to a gasoline engine in the preferred and illustrated embodiments. However, the present invention may be applied to other type of engines, such as diesel engines.

Therefore, the present examples and embodiments are to be considered as illustrative and not restrictive, and the invention is not to be limited to the details given herein, but may be modified within the scope and equivalence of the appended claims.

What is claimed is:

1. An apparatus for controlling an engine that produces power by burning a mixture of air and fuel in a combustion chamber, wherein the engine performs a combustion mode selected from a plurality of combustion modes, the combustion modes being stratified charge combustion in which the mixture is distributed in a concentrated manner in the combustion chamber, homogeneous charge combustion in which the mixture is distributed in a homogeneous manner in the combustion chamber, and semi-stratified charge combustion having characteristics of both stratified charge combustion and homogeneous charge combustion, wherein the apparatus comprises:

an injector for injecting fuel into the combustion chamber, wherein the injector injects fuel in a manner appropriate for the combustion mode being performed;

an adjuster for adjusting the state of the air drawn into the combustion chamber;

a selector for selecting one among the combustion modes in accordance with the load applied to the engine;

a first controller for controlling the adjuster such that the state of the air drawn into the combustion chamber is appropriate for the selected combustion mode;

a second controller for controlling the injector to perform the selected combustion mode, wherein the second controller controls the injector to perform semi-stratified charge combustion for a determined time period before performing a newly selected combustion mode when the selector changes the combustion mode between stratified charge combustion or semi-stratified charge combustion and homogeneous charge combustion; and a time period varying circuit for varying the time period for performing semi-stratified charge combustion in accordance with changes in the state of the air drawn into the combustion chamber.

2. The apparatus according to claim 1, wherein the time period varying circuit extends the time period for performing semi-stratified charge combustion as the degree of change in the state of the intake air from the previous combustion mode to a newly selected combustion mode increases.

3. The apparatus according to claim 1, wherein the time period varying circuit sets the time period for performing semi-stratified charge combustion at a duration required for the intake air to change to a state optimal for a newly selected combustion from a state optimal for the previous combustion mode.

4. The apparatus according to claim 1, wherein the engine includes an intake passageway connected to the combustion chamber to supply the combustion chamber with the air, wherein the adjuster includes a valve located in the intake passageway and controlled by the first controller to achieve a target position, and wherein the apparatus further comprises a computer for computing the difference between the actual position of the valve and the target position of the valve to obtain a value representative of the degree of change in the state of the intake air.

5. The apparatus according to claim 4, wherein the intake passageway is formed to produce a swirling motion of the intake air, and wherein the valve includes a swirl control valve for adjusting the intensity of the swirling motion.

6. The apparatus according to claim 4, wherein the valve includes a throttle valve for adjusting the amount of air drawn into the combustion chamber.

7. The apparatus according to claim 4, wherein the time period varying circuit extends the time period for performing semi-stratified charge combustion as the difference between the actual position of the valve and the target position of the valve becomes greater.

8. The apparatus according to claim 4, wherein the time period varying circuit sets the time period for performing semi-stratified charge combustion at least for a duration required for the difference between the actual position of the valve and the target position of the valve to become equal to or lower than a reference value after the selector changes the combustion mode.

9. The apparatus according to claim 1, wherein the second controller controls the injector such that stratified charge combustion is performed by injecting fuel into the combustion chamber during the compression stroke, homogeneous charge combustion is performed by injecting fuel during the intake stroke, and semi-stratified charge combustion is performed by injecting fuel during both the compression and intake strokes.

10. The apparatus of claim 1, wherein the state of the air is a motion of the air within the combustion chamber.

11. The apparatus of claim 10, wherein the motion of the air within the combustion chamber is a swirling of the air within the combustion chamber.

12. An apparatus for controlling an engine that produces power by burning a mixture of air and fuel in a combustion chamber, wherein the engine performs a combustion mode selected from a plurality of combustion modes, the combustion modes being stratified charge combustion in which the mixture is distributed in a concentrated manner in the combustion chamber, homogeneous charge combustion in which the mixture is distributed in a homogeneous manner in the combustion chamber, and semi-stratified charge combustion having characteristics of both stratified charge combustion and homogeneous charge combustion, wherein the apparatus comprises:

an injector for directly injecting fuel into the combustion chamber, wherein the injector performs stratified charge combustion by injecting fuel during the compression stroke, homogeneous charge combustion by injecting fuel during the intake stroke, and semi-stratified charge combustion by injecting fuel during both the compression and intake strokes;

an intake passageway connected to the combustion chamber to supply the combustion chamber with the air;

a valve located in the intake passageway to adjust the state of the air drawn into the combustion chamber;

a selector for selecting one among the combustion modes in accordance with the load applied to the engine;

a first controller for controlling the valve to achieve a target position such that the state of the air drawn into the combustion chamber is appropriate for the selected combustion mode;

a second controller for controlling the injector to perform the selected combustion mode, wherein the second controller controls the injector to perform semi-stratified charge combustion for a determined time period before performing a newly selected combustion mode when the selector changes the combustion mode between stratified charge combustion or semi-stratified charge combustion and homogeneous charge combustion;

a detector for detecting changes in the state of the air drawn into the combustion chamber; and a time period varying circuit for varying the time period for performing semi-stratified charge combustion in accordance with the detected changes in the state of the intake air.

13. The apparatus according to claim 12, wherein the time period varying circuit extends the time period for performing semi-stratified charge combustion as the degree of change in the state of the intake air from the previous combustion mode to a newly selected combustion mode increases.

14. The apparatus according to claim 13, wherein the time period varying circuit sets the time period for performing semi-stratified charge combustion at a duration required for the intake air to change to a state optimal for a newly selected combustion mode from a state optimal for the previous combustion mode.

15. The apparatus according to claim 13, wherein the detector computes the difference between the actual position of the valve and the target position of the valve to obtain a value representative of the degree of change in the state of the intake air from the previous combustion mode to a newly selected combustion mode.

16. The apparatus according to claim 15, wherein the intake passageway is formed to produce a swirling motion of the intake air, and wherein the valve includes a swirl control valve for adjusting the intensity of the swirling motion.

17. The apparatus according to claim 15, wherein the valve includes a throttle valve for adjusting the amount of air drawn into the combustion chamber.

18. The apparatus according to claim 15, wherein the time period varying circuit sets the time period for performing semi-stratified charge combustion at least for a duration required for the difference between the actual position of the valve and the target position of the valve to become equal to or lower than a reference value after the selector changes the combustion mode.

19. A method for controlling an engine that produces power by burning a mixture of air and fuel in a combustion chamber, wherein the engine performs a combustion mode selected from a plurality of combustion modes, the combustion modes being stratified charge combustion in which the mixture is distributed in a concentrated manner in the combustion chamber, homogeneous charge combustion in which the mixture is distributed in a homogeneous manner in the combustion chamber, and semi-stratified charge combustion having characteristics of both stratified charge combustion and homogeneous charge combustion, wherein the method comprises the steps of:

injecting fuel into the combustion chamber with an injector, wherein the injector injects fuel in a manner appropriate for the combustion mode being performed;

selecting the combustion mode that is to be performed in accordance with the load applied to the engine;

adjusting the state of the air drawn into the combustion chamber in accordance with the selected combustion mode;

controlling the injector to perform injection according to the selected combustion mode, wherein the injector is controlled to perform semi-stratified charge combustion for a determined time period before performing a newly selected combustion mode when the selected combustion mode is switched between stratified charge combustion or semi-stratified charge combustion and homogeneous charge combustion; and varying the time period for performing semi-stratified charge combustion in accordance with changes in the state of the air drawn into the combustion chamber.

20. The method of claim 19, wherein adjusting the state of the air comprises adjusting a motion of the air within the combustion chamber.

* * * * *